June 4, 1929.  M. H. SHELTON  1,715,719
COMBINED TIRE COVER AND TOOL BOX
Filed Feb. 27, 1928  2 Sheets-Sheet 1

Inventor
M. H. Shelton
Wilkinson & Giusta
Attorneys.

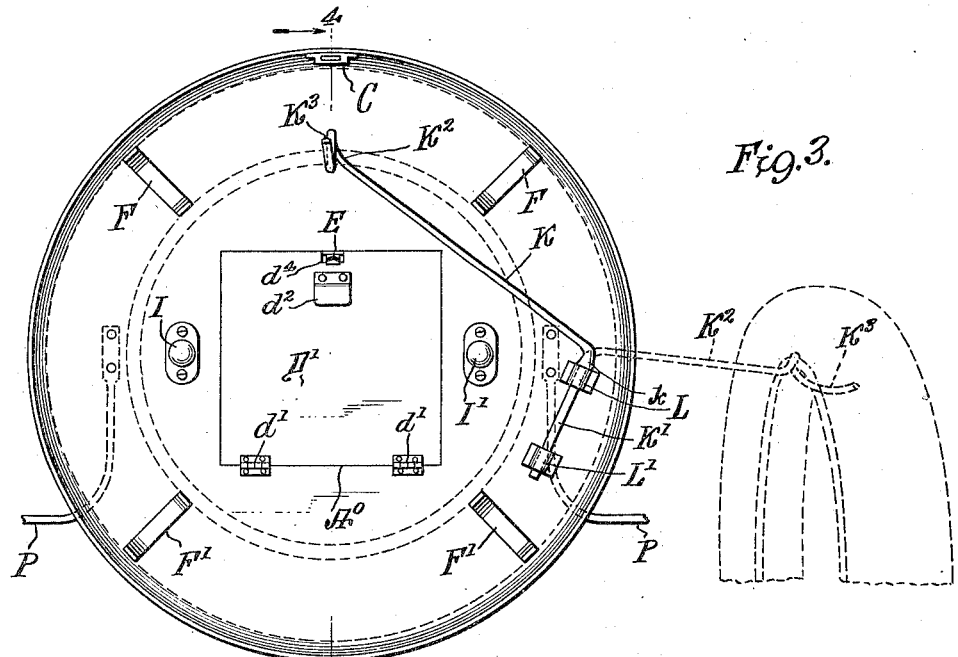
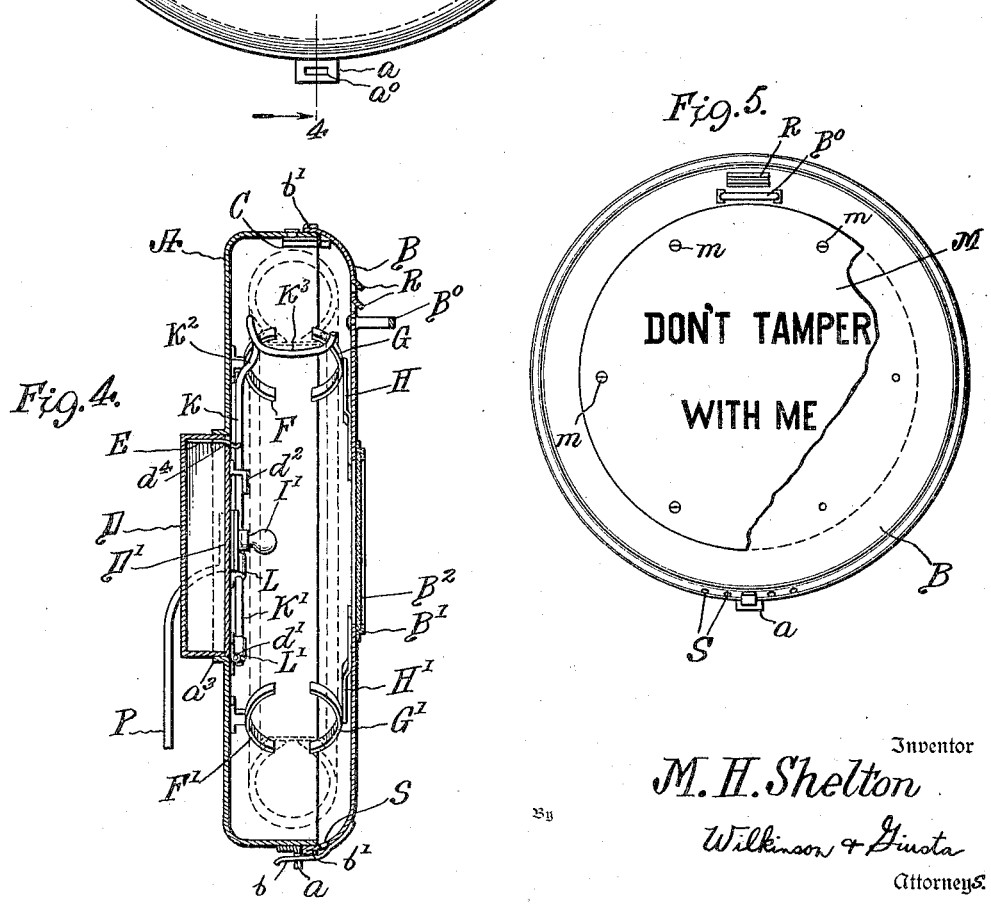

Patented June 4, 1929.

1,715,719

UNITED STATES PATENT OFFICE.

MARVIN H. SHELTON, OF TAMPA, FLORIDA.

COMBINED TIRE COVER AND TOOL BOX.

Application filed February 27, 1928. Serial No. 257,377.

My present invention relates to improvements in combined tire covers and tool boxes for use on automobiles, and it is intended to provide a convenient cover for the tire with the tool box accessible from the center of the tire, and to use the arrangement for advertising purposes, as will be hereinafter described.

My present invention is intended to provide improvements on the construction illustrated and described in my copending application, Serial No. 241,130, filed December 19, 1927, and entitled Improvements in combined tire cover and tool box.

The invention is also intended to provide means for facilitating the insertion of the tire in the casing or its removal therefrom, as will be hereinafter more fully described.

It is well known that the prolonged exposure of rubber tire casings to heat and sunlight is apt to produce chemical changes in the rubber which will cause the deterioration of the tire casing, shorten the life and impair the efficiency thereof, and for this reason it is desirable to cover up the spare tires carried by an automobile; and it is, of course, desirable to make such cover as sightly and as attractive as possible.

Experience often proves that when it becomes necessary to change a tire or to remove the spare tire from its cover, as frequently occurs at night or in a rain storm, certain tools are required; and these tools are most frequently located under the seats of the vehicle or in some inconvenient position.

My invention consists in providing a combined tire casing and tool box so arranged as not to require any additional parts to the car, yet to have the tools conveniently accessible and the tire held in a neat and attractive container.

This arrangement may be used for advertising purposes and may be securely locked against theft.

My invention will be more fully understood after reference to the accompanying drawings, in which like parts are indicated by similar reference symbols throughout the several views, and in which, Figure 1 is a rear elevation with parts broken away showing the apparatus as attached to the rear end of the automobile, the outlines of the automobile being shown in dotted lines and the tire and rim being in place in the container.

Figure 3 shows the inside of the container with the cover removed, the tire being shown in dotted lines enclosed therein and also swung out in dotted lines.

Figure 4 shows a section along the line 4—4 of Figure 3, looking in the direction of the arrows, but with the cover in place, and Figure 5 shows a modification, but with the cover plain, and supplied with an advertising disk.

Figure 1:
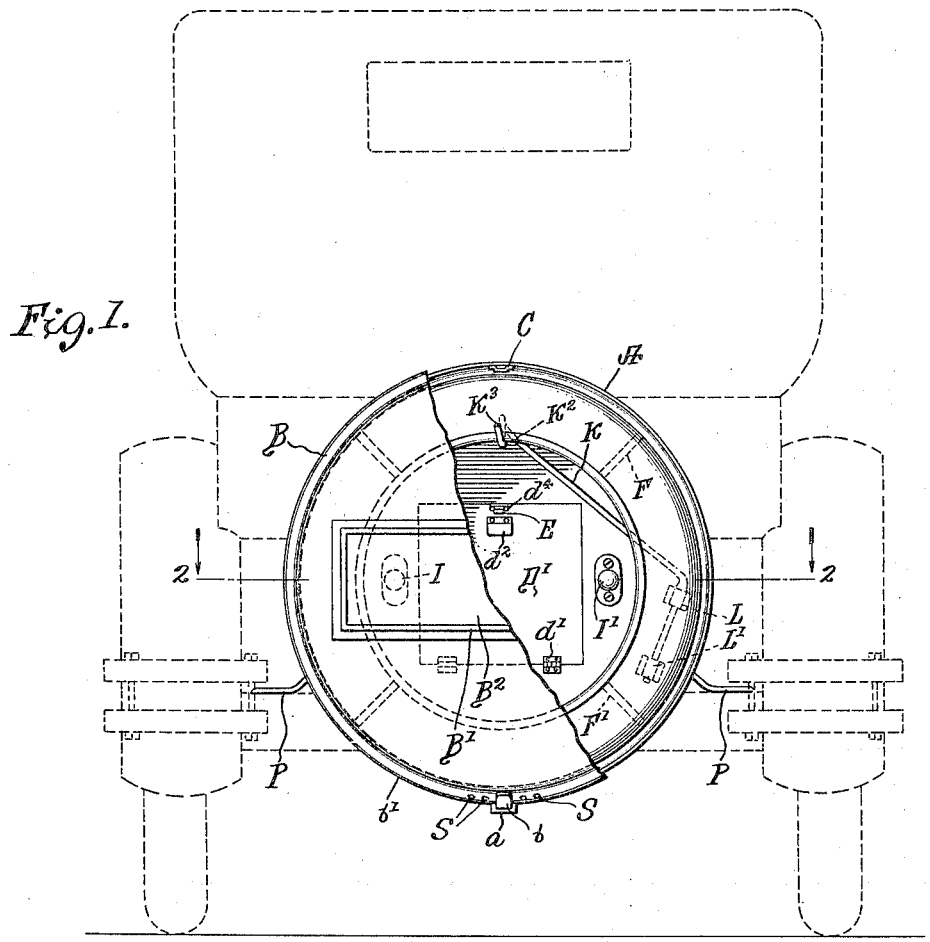

The container for the tire is composed of two parts, a body portion A and the cover B, which cover is adapted to fit snugly on the body portion like the front and back of a hunting-case watch. The cover may be made plain, as shown in Figure 5, or provided with a window B' covered with translucent material $B^2$, such as mica, celluloid, or the like. Displayed in connection with this window, may be any suitable advertising device, which may be applied directly to the window or separately, as may be desired, but it is not shown herein.

The cover B is provided with a handle $B^0$ and a lug $b$, which projects into the slot $a^0$ in the lug $a$ carried at the lower end of the body portion A of the casing.

At the top of the casing and cover, I provide a suitable spring lock C as shown in Figures 3 and 4.

In the center of the rear wall of the casing I provide an opening $A^0$ surrounded by the flange $a^3$. This opening may be of any desired shape, but I have shown the same as rectangular. Projecting through this opening $A^0$ and held by the flange $a^3$, is the tool box D, which opens to the rear and is normally closed by the door D'. This door is hinged at its bottom of $d'$, and is provided near its top with a handle $d^2$. This door is also notched, as at $d^4$, to permit the passage therethrough of the spring latch E, shown in Figure 4. By pulling out on the handle $d^2$, this spring latch allows the door to swing open, but when the door is swung to the closed position, this latch will hold the same in position.

This door normally swings clear of the rim when the tire is mounted in the casing, as shown in Figure 3.

In order to hold the tire firmly in the casing, I provide yokes F and F' attached to the member A, and similar yokes G and G' carried by the leaf spring H and H', which are attached to the cover B. Thus when the tire is in the casing and the cover in place, the tire will be held securely but yieldingly in its cover, and at the same time, free access may be had to the tool box.

In order to use the device for advertising purposes I may provide in front of the window B' electric lamps I and I', which may be made red or other color, as desired, or the window may be red, and thus these will serve as a tail light, as well as display any advertising in the window B'.

It will be noted that these lights will be clear of the rim of the tire in assembling or disassembling the device, and these lamps I and I' should not be of sufficient depth to touch the disk of the wheel should a disk wheel be used.

In order to facilitate inserting the tire in the casing or in removing the same therefrom, I provide a swinging derrick arm, which comprises a bent rod K, having its lower arm K' shouldered at $k$ to engage the bracket bearing L. The lower end of this arm engages in the bracket bearing L'. The upper end of the rod is bent inward, as at $K^2$, and is then bent forwards to form a hook $K^3$ which engages the tire rim or the tire alone when the tire is carried without a rim.

In order to mount the tire in the casing, swing this derrick arm to the position shown in Figure 3, lift the tire and rim, and put it over the hook $K^3$. Then swing hook $K^3$ to the position shown in full lines in Figure 3, and the tire will engage the yokes F and F', and will be held therein until the cover is put in place.

In order to remove the tire, take off the cover, and swing the arm K from the full line position, shown in Figure 3 to the dotted line position, and the tire will swing out and may be removed, and another tire put in its place.

It will be noted that when the derrick arm just described is used, the tire and rim are clear of the lamps I and I', and the tool box will be fully accessible from the rear when the cover B is removed.

When a disk wheel is used, it will be impracticable to swing the tire and rim with the derrick arm just described, and this rod may be unshipped from its bearings L and L' and stored away in the car. Thus the device may be used with or without the derrick arm.

Figure 2:
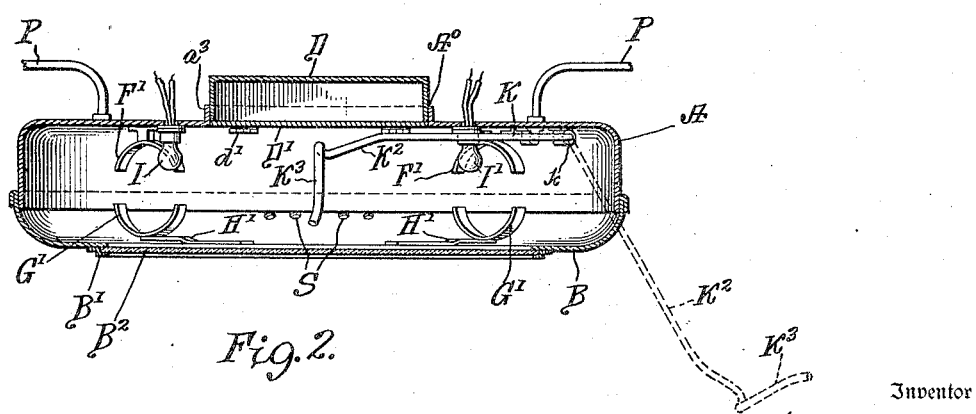
Figure 2 shows a horizontal section along the line 2—2 of Figure 1, looking down, with the tire and rim removed and the supporting arm being shown in full lines inside the container, and in the swung out position in dotted lines.

Instead of providing the cover B with a window B', as shown in Figures 1, 2 and 4, the cover B may be made in the form of a metal cup-shaped disk and burnished if desired or advertising media may be applied to the exterior of the cover, as for instance, the circular disk M, shown in Figure 5. This disk may bear any suitable advertisement.

Obviously such advertisement may be used with or in connection with the window. In order to change the advertisement, the disk may be made removable, as by means of the screws $m$, and other disks having different advertisements may be applied.

Obviously it would be desirable to change the advertisement from time to time.

We have shown the words, "Don't Tamper with Me", as typical of any form of advertisement that may be used in connection with this device.

Ventilating slots R may be provided near the top of the cover, and drain holes S at the bottom thereof to provide for proper ventilation and drainage.

The body portion of the casing may be attached to the automobile in any convenient way, as by the arms P.

While I have described one embodiment of the invention in its preferred form it will be obvious that various changes might be made in the construction, combination and arrangement of parts, which might be used without departing from the spirit of my invention, and I do not mean to limit the invention to such details, except as particularly pointed out in the claim.

Having thus described my invention, what I claim and desire to secure by Letters Patent of the United States is:—

A combined tire cover and tool box adapted to be carried by automobiles comprising two reversely disposed dished annular metal shells, adapted to fit together to form a closed container to receive the tire, means for securing the front shell to the automobile, and means for detachably connecting the rear shell to the front shell, the front shell being provided with a central opening therein, and a hinged door normally closing said opening, a tool box projecting from said front shell in front of said door, a bent rod pivotally mounted in the rear shell and provided with a hook adapted to engage and support the tire as it is moved in or out of said shell, and clips carried by said front and rear shells, respectively, for holding the tire in place in said container.

M. H. SHELTON.